United States Patent Office 2,790,424
Patented Apr. 30, 1957

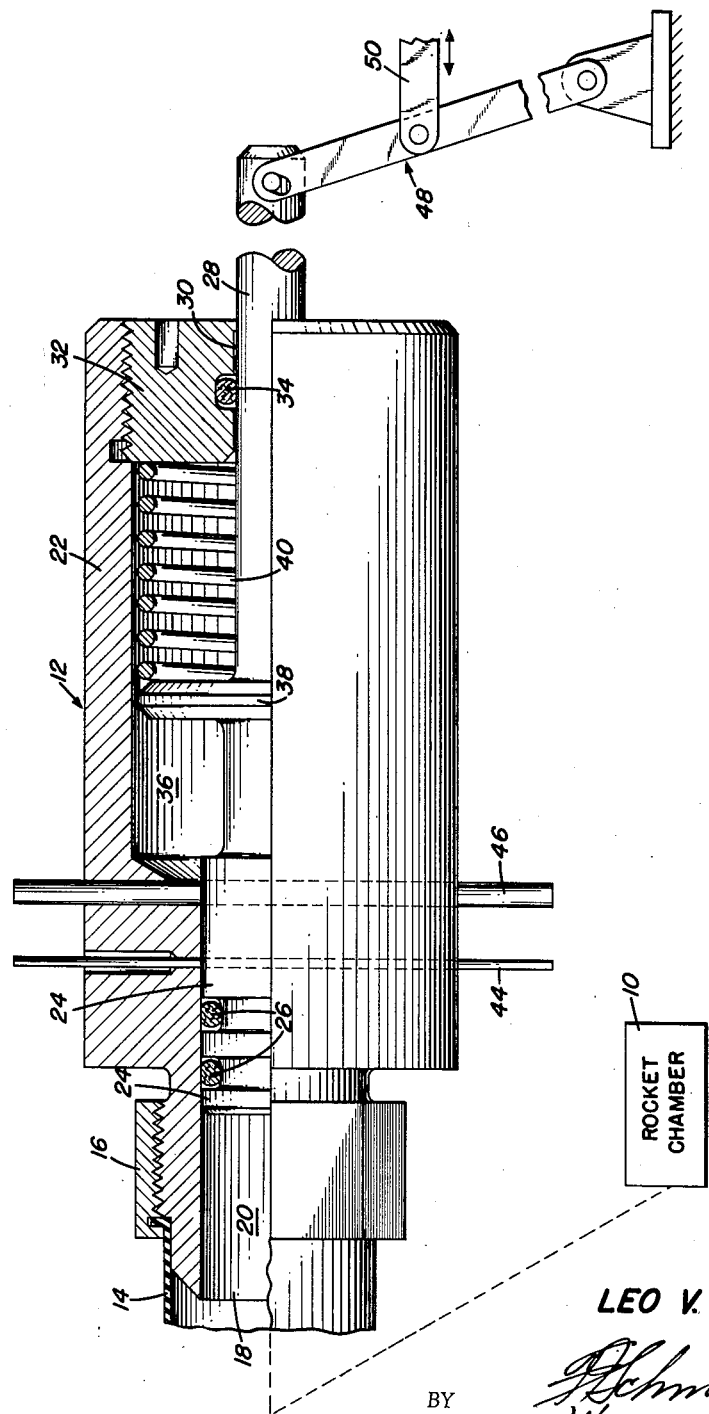

---

2,790,424

PRESSURE CHANGE RESPONSIVE MOTOR WITH SHEAR WIRE

Leo V. Giladett, Silver Spring, Md.

Application October 5, 1953, Serial No. 384,356

1 Claim. (Cl. 121—38)

(Granted under Title 35, U. S. Code (1952), sec. 266)

The invention described herein may be manufactured and used by or for the Government of the United States of America for governmental purposes without the payment of any royalties thereon or therefor.

This invention relates to devices for performing work in inaccessible places, especially remote locations, or on a rocket while in flight.

The purpose of the invention is to provide a way of causing work to be done at a remote and/or inaccessible place upon the occurrence of an event, as successive increase and decrease in pressures accompanying rocket flight. There are many reasons why work may be useful under the above conditions, some being to actuate a camera, operate an aerodynamic control surface, actuate an engine control, set recording or other instruments in motion and many others too numerous to mention. The fuel burning chamber of a rocket or other type of engine is first subjected to superatmospheric pressure and then, a lower pressure at burnout. Accordingly, the energy for actuating the motor of the instant invention is available in the rocket chamber.

A more specific object of the invention is to provide a motor for the previously mentioned purposes and others to which the motor may be logically applied, which includes a housing having a piston in it to connect to a linkage, lever or other item to be actuated, the piston having rocket chamber pressure applied to one end of it so that the piston is moved when the engine is started, breaking a shear pin lock and compressing a motor spring that opposes the motion of the piston and motivates it at rocket burnout, that is when the pressure on the piston is reduced to the level of pressure in the rocket chamber.

Other objects and features, such as the simplicity of the motor, will become apparent in following the description of the drawing wherein the figure is a partial elevation and section of a typical motor embodying the principles of the invention, the rocket chamber and the connection of the motor with it being shown schematically, and the linkage that is actuated by the motor exemplifying any type of control item which is to be actuated.

Rocket chamber 10 is shown. However, it may be substituted by a jet engine combustion chamber or other source of pressure which is subject to change. The motor 12 is adapted to connect to the rocket chamber, as by conduit 14 that is connected by coupling 16 to the open end 18 of bore 20 in motor housing 22. Bore 20 extends through the housing 22 and accommodates piston 24, the latter having rings 26 in suitable piston grooves.

Piston rod 28 extends through a passage 30 in closure plug 32, threaded in an end of body 22, and there is a seal 34 in passage 30 in contact with piston rod 28. A part 36 of bore 20 is enlarged, counterbored in this instance, and there is a shoulder 38 on rod 28 located in part 36 of bore 20. A spring 40 or a suitable equivalent is seated on shoulder 38 and the inner surface of plug 32 that closes the end of part 36.

Two wires or pins 44 and 46, respectively, extend through aligned openings in the motor housing 22 and piston 24. Wire 44 is a shear pin serving as a lock, and wire 46 is a safety device which is to be manually removed when future operation is desired.

In operation, the piston is moved in bore 20 against the yielding opposition of spring 40 until wires 44 and 46 may be inserted in their aligned apertures. The power take-off is at rod 28, and for this purpose linkage 48 is provided to show schematically a typical system to be actuated. The linkage is pivoted to rod 28 and includes a link 50 adapted to connect to a switch, lever or other device or element.

At the position of piston 24 where wires 44 and 46 may be inserted, spring 40 is compressed, but not to minimum length. The rocket is then prepared for launching or other firing and the pin 46 is removed. As the pressure in the rocket chamber is increased, the piston 24 applies a shearing force to pin 44 since conduit 14 applies the rocket chamber pressure to the piston 24. When the pressure is great enough, shear pin 44 is broken and the piston is moved by rocket chamber pressure force in a direction to compress spring 40 to solid length. As long as the superatmospheric pressure in the chamber is maintained, the spring 40 remains fully compressed, acting as a stop for the piston. Upon reduction of the rocket chamber pressure, as at rocket burnout, the potential energy stored in spring 40 is converted to kinetic energy by moving the piston 24 in bore 20, thereby, actuating linkage 48. Accordingly, the piston of motor 12 is responsive to successive increase in pressure for releasing the lock formed by shear pin 44, and a decrease in pressure allowing the spring to motivate the piston.

It is apparent that variations may be made without departing from the invention.

What is claimed is:

A fluid motor comprising a cylinder having a piston therein, means to admit fluid under pressure to said cylinder to actuate said piston, a spring acting on said piston and tending to urge it in the opposite direction from the urging of the pressure fluid and a shear wire passed through said cylinder and said piston, whereby upon an increase in fluid pressure the wire will be sheared and the piston moved in a direction to compress the spring and upon decrease in fluid pressure the piston will be moved in the opposite direction by spring action, and a safety pin passed through the cylinder and piston to prevent accidental shearing of said shear wire.

References Cited in the file of this patent

UNITED STATES PATENTS

| 834,274 | Dewson | Oct. 30, 1906 |
| 1,103,020 | Austin | July 14, 1914 |
| 1,824,457 | Barlow | Sept. 22, 1931 |
| 2,030,686 | Davis | Feb. 11, 1936 |
| 2,132,148 | Davis | Oct. 4, 1938 |
| 2,149,641 | Temple | Mar. 7, 1939 |
| 2,181,562 | De Ganahl | Nov. 28, 1939 |
| 2,330,518 | Rothery | Sept. 28, 1943 |
| 2,453,812 | Phelan | Nov. 16, 1948 |
| 2,535,588 | Mead | Dec. 26, 1950 |

FOREIGN PATENTS

| 530,834 | France | Oct. 11, 1921 |